United States Patent
Jodeleit et al.

(10) Patent No.: US 7,841,816 B2
(45) Date of Patent: Nov. 30, 2010

(54) HYBRID COMPONENT

(75) Inventors: Martin Jodeleit, Bielefeld (DE); Hans-Joachim Dembowsky, Hamburg (DE); Jochen Rintelmann, Dessau-Roβlau (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 167 days.

(21) Appl. No.: 12/207,781

(22) Filed: Sep. 10, 2008

(65) Prior Publication Data

US 2009/0067920 A1 Mar. 12, 2009

(30) Foreign Application Priority Data

Sep. 12, 2007 (DE) .................. 20 2007 012 797 U

(51) Int. Cl.
*F16B 13/04* (2006.01)
(52) U.S. Cl. ........................................ 411/34; 411/903
(58) Field of Classification Search ................ 411/901, 411/902, 903, 908, 34, 39, 41–43, 501–503, 411/506, 507, 372.5, 373, 375; 24/297
See application file for complete search history.

(56) References Cited

U.S. PATENT DOCUMENTS

| | | | | |
|---|---|---|---|---|
| 2,759,390 A | * | 8/1956 | Edwards | 411/15 |
| 5,603,592 A | * | 2/1997 | Sadri et al. | 411/34 |
| 6,086,035 A | * | 7/2000 | Trifilio | 248/305 |
| 6,142,435 A | * | 11/2000 | Lodi | 248/222.41 |
| 6,880,787 B2 | * | 4/2005 | Stephen et al. | 248/68.1 |
| 6,886,793 B2 | * | 5/2005 | Snell | 248/309.1 |
| 7,179,032 B2 | * | 2/2007 | Guy | 411/34 |
| 7,384,226 B2 | * | 6/2008 | Jones et al. | 411/508 |

FOREIGN PATENT DOCUMENTS

| | | |
|---|---|---|
| DE | 7319054 | 5/1973 |
| DE | 32 45 055 A1 | 6/1984 |
| DE | 299 19 502 U1 | 5/2001 |
| DE | 199 62 595 A1 | 6/2001 |
| DE | 20 2004 019 153 U1 | 3/2005 |
| EP | 0 766 011 A1 | 4/1997 |
| EP | 1 191 175 A2 | 3/2002 |
| EP | 1 312 811 A1 | 8/2002 |
| EP | 1 296 069 A2 | 3/2003 |
| GB | 1 354 351 | 5/1974 |
| GB | 2302148 A | 1/1997 |
| GB | 2 378 739 | 2/2003 |

\* cited by examiner

*Primary Examiner*—Gary Estremsky
(74) *Attorney, Agent, or Firm*—Seyfarth Shaw LLP

(57) ABSTRACT

Hybrid component for the fastening of functional elements, in particular in an automobile, which has the following characteristics: a component foot consisting of a blind rivet construction made of metal with which the hybrid component can be rigidly fastened to a structural component; a fastening appendage, which is connected with the component foot and comprises a fastening contour for a functional component, wherein the functional component is made of plastic and is connected with the fastening appendage so that a component can be coupled with the structural component via the functional component and the component foot.

8 Claims, 4 Drawing Sheets

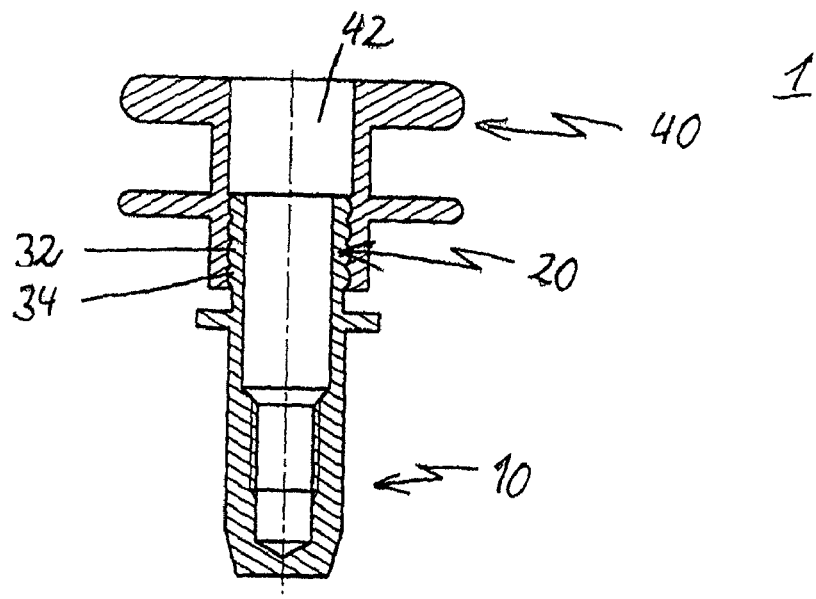
Fig. 2
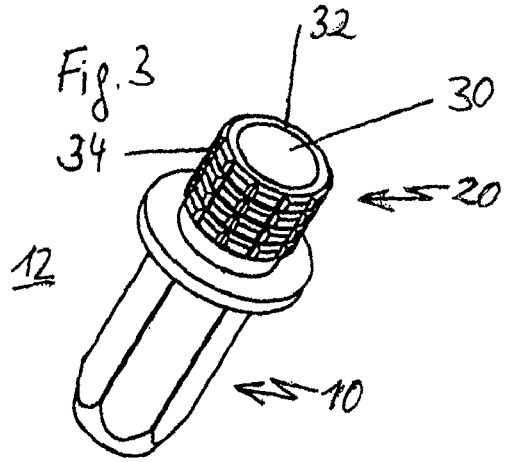
Fig. 3
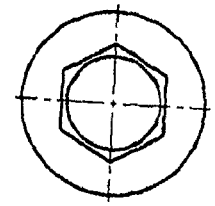
Fig. 4
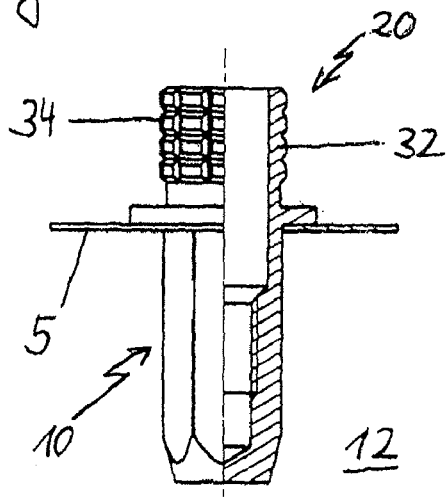
Fig. 5 A)
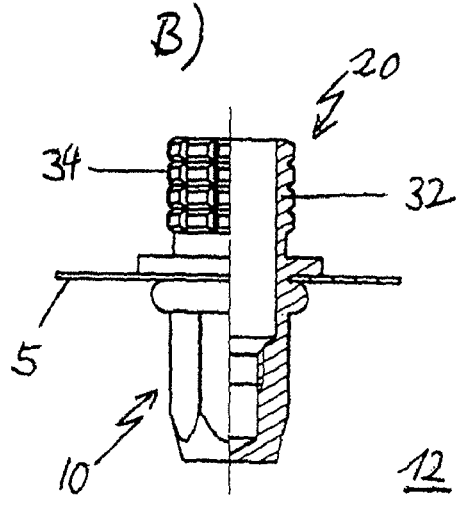
B)

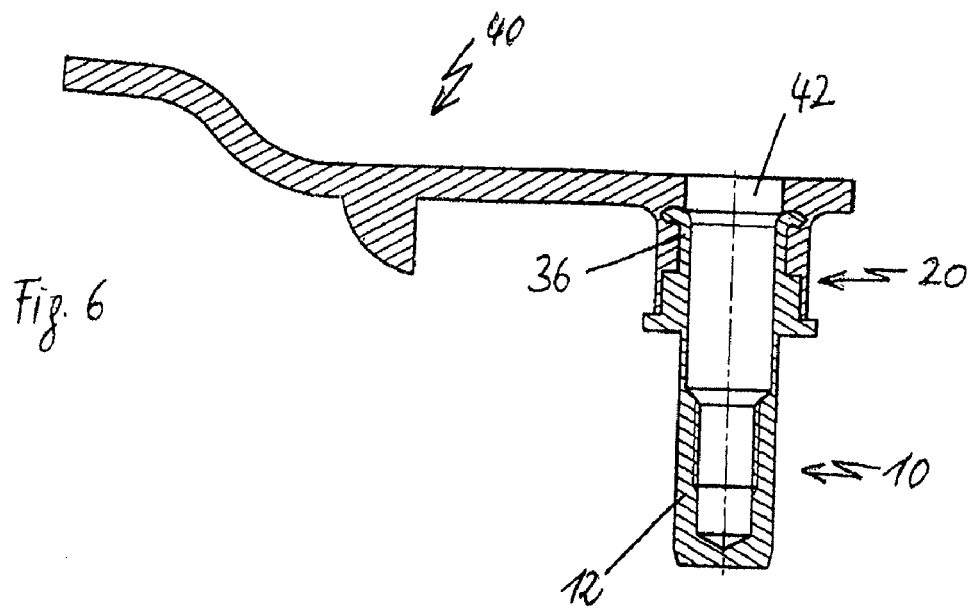
Fig. 6
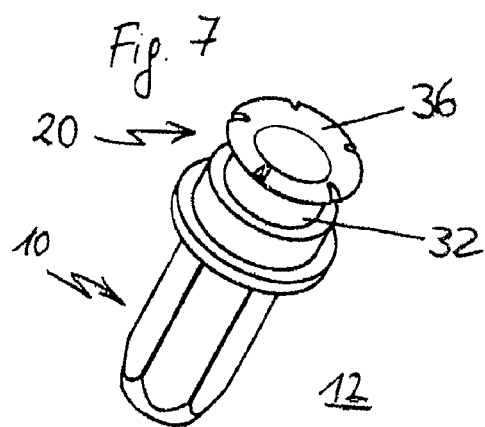
Fig. 7
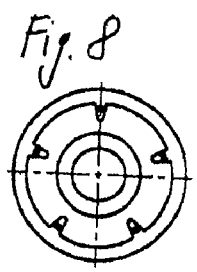
Fig. 8
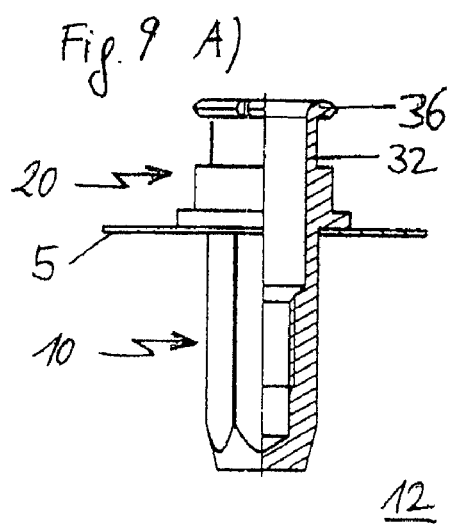
Fig. 9 A)
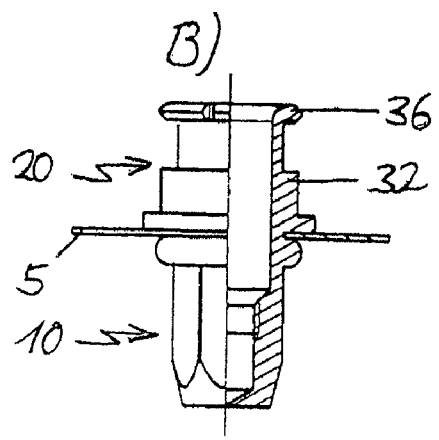
B)

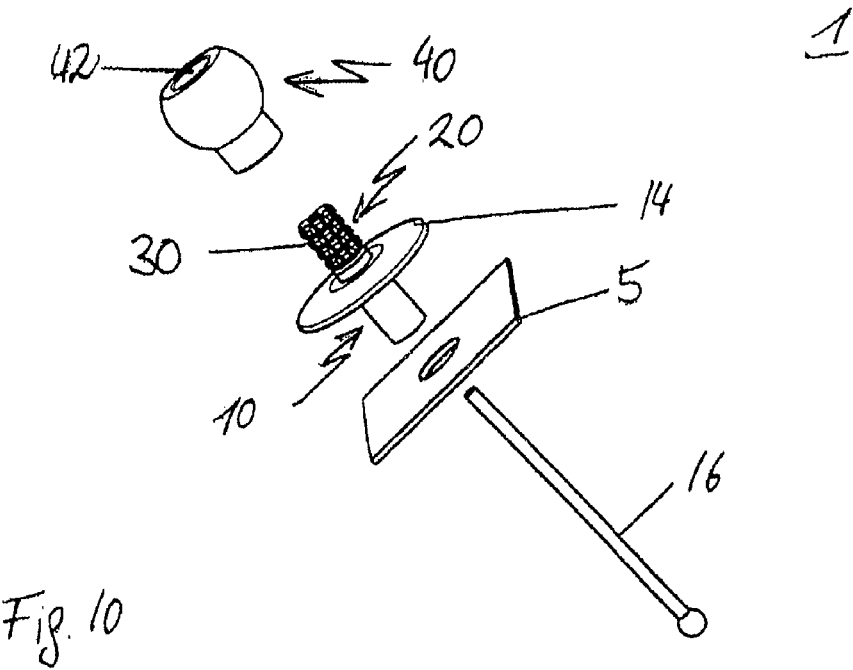
Fig. 10
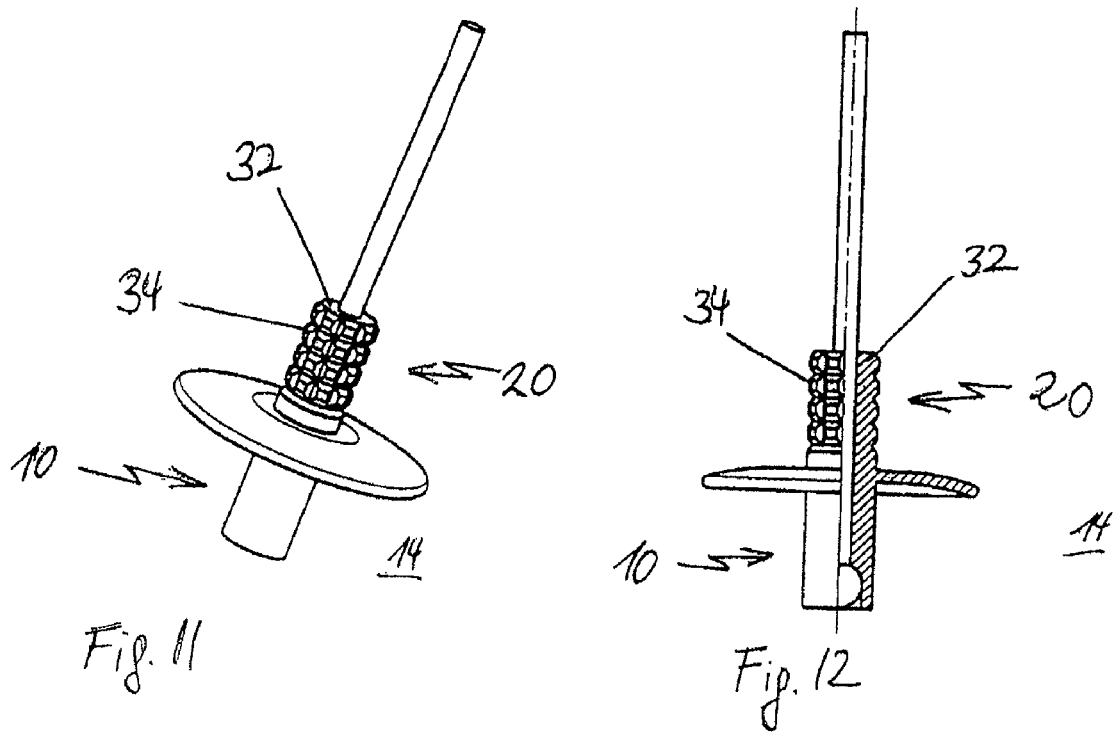
Fig. 11
Fig. 12

HYBRID COMPONENT

BACKGROUND OF THE INVENTION

The present invention relates to a hybrid component for the fastening of functional elements, in particular in an automobile.

In the state of the art, plastic fasteners are known that serve to couple or fasten components to structural parts. One application area is for example automotive engineering, in which the body or the frame of the automobile represents such a structural component. Among other things, coverings or linings in the engine compartment or on the inside of the automobile are attached with the help of these plastic fasteners. The fastening of these components is not rigid due to the flexibility of the plastic. Thus, vibrations in the automobile can lead for example to a loosening of the parts and thus to a reduced service life or to faster wear and tear.

SUMMARY OF THE INVENTION

It is thus the object of the present invention to provide in comparison to the state of the art a more stable connection, with which components can be fastened easily and permanently to structural components in the automobile.

The aforementioned object is solved through a hybrid component in accordance with the independent patent claim 1 and through a structural component with hybrid component in accordance with the independent patent claim 9. Advantageous embodiments and further developments of the invention result from the following description, the accompanying drawings and the attached claims.

The hybrid component according to the invention has the following characteristics: a component foot consisting of a blind rivet construction made of metal, with which the hybrid component can be fastened rigidly to a structural component, a fastening appendage, which is connected with the component foot and comprises a fastening contour for a functional component, while the functional component is made of plastic and is connected with the fastening appendage, so that a component can be coupled with the structural component via the functional component and the component foot.

The hybrid component according to the invention provides a high-strength connection option for other parts, for example in the automobile. The basis of the hybrid component is a blind rivet construction, which provides a stable connection with for example the frame or the body of the automobile. The blind rivet construction thus provides a rigid foundation for the functional component made of plastic. The functional component is in turn the coupling member for a component to be fastened. Such types of components to be fastened include bumpers, coverings, linings, just to name a few examples from the automotive field.

In accordance with one embodiment of the present invention, the component foot is formed through a blind rivet nut or a blind rivet. In another embodiment, the component foot comprises a fastening appendage, which is connected integrally with the component foot. This fastening appendage is designed with a fastening contour, on the base of which a torque-proof and/or axially unshiftable anchoring of the functional component can be realized on the component foot.

Since the fastening appendage forms the base for a form- and/or force-fit connection between the component foot and the functional component due to its shape, different embodiments of the fastening contour are preferred. In accordance with one alternative, the fastening contour comprises a cylindrical area with a knurl lying outside radially, which forms an undercut against rotation and/or axial translation. In accordance with another alternative, the fastening contour has an imprinting created through cold forming.

BRIEF DESCRIPTION OF THE FIGURES

The present invention is explained in greater detail using the accompanying drawings.

FIG. 2 shows a sectional view of an embodiment of the hybrid component consisting of a blind rivet nut and mushroom head, FIG. 3 shows a perspective view of a blind rivet nut from the embodiment according to FIG. 2, FIG. 4 shows a view from the top of the rivet shaft of the blind rivet nut according to FIG. 3, FIG. 5A, B show a partial sectional view of the blind rivet nut from FIG. 3 in the unfastened (A) and in the fastened state (B) in a structural component, FIG. 6 shows a sectional view of the embodiment of the hybrid component according to FIG. 1B, FIG. 7 shows a perspective view of the blind rivet nut from FIG. 6, FIG. 8 shows an axial view from the top of the fastening appendage of the blind rivet nut from FIG. 7, FIG. 9A, B show the blind rivet nut from FIG. 7 in the unfastened (A) and in the fastened state (B) in a structural component, FIG. 10 shows an exploded view of the embodiment of the hybrid component according to FIG. 1C, FIG. 11 shows a perspective view of the bucket blind rivet from FIG. 10 and FIG. 12 shows a partial sectional view of the bucket blind rivet from FIG. 10.

DETAILED DESCRIPTION OF THE EXEMPLARY EMBODIMENTS OF THE INVENTION

Figure 1:
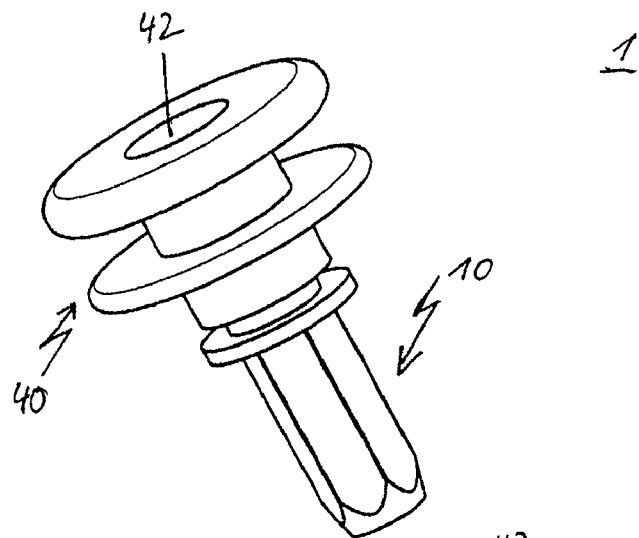
FIG. 1A through C show a perspective or sectional view of different embodiments of the hybrid component.
Figure 1:
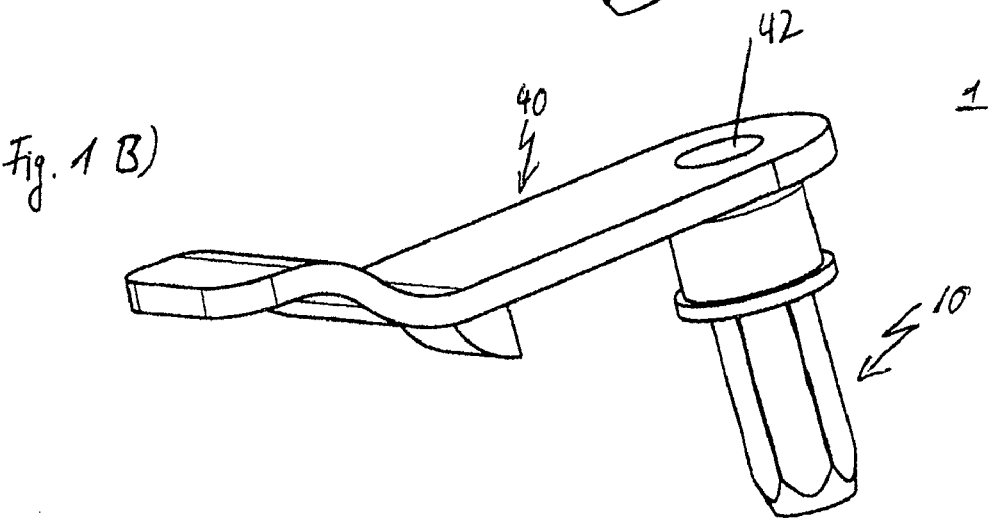
Figure 1:
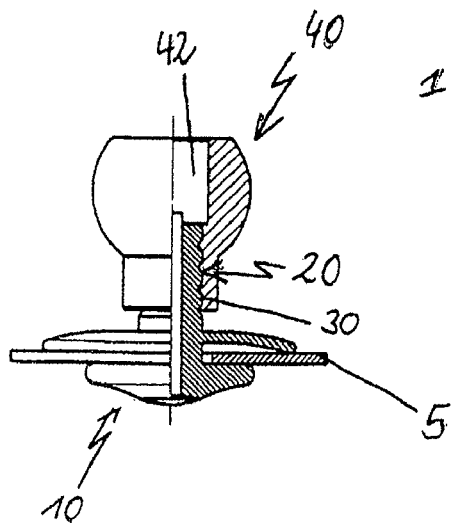

FIGS. 1A through C show different examples for the hybrid component 1 according to the invention. Each hybrid component 1 includes one component foot 10. The latter is made of a rivet construction, for example similar to a blind rivet nut or a bucket sealed blind rivet. Since the component foot is made of metal and can be fastened on a structural component 5, the entire hybrid component 1 can also be rigidly fastened to the structural component 5, for example a frame of an automobile.

The hybrid component 1 also comprises a fastening appendage 20. This fastening appendage 20 is integrally connected with the component foot 10 or the rivet construction. The fastening appendage 20 serves to fasten a functional component 40 made of plastic on the component foot 10. The functional component 40 is for example a flat or mushroom head according to FIG. 1A, a holder for a bumper according to FIG. 1B or a ball head according to FIG. 1C. The functional component 40 is already permanently connected with the fastening appendage 20 before the riveting of the component foot 10 in a structural component 5. In order to guarantee a reliable riveting of the component foot 10, the functional component 40 comprises a penetrating opening 42. The opening 42 ensures a penetration through the functional component 40, in order to be able to fasten without problem a blind rivet nut 12 with a threaded pin (not shown) or a bucket sealed blind rivet with the help of a rivet pin 16 (see FIGS. 10 through 12).

With the present invention, one is able to connect the hybrid component 1 as adapted fastener with just one working step to a structural component 5 of the body or frame of an automobile, for example in the final assembly of an automobile. The hybrid component 1 creates a rigid or high-strength connection with the structural component 5, while the advantages of the plastic for the fastener are retained via the functional component 40 made of plastic. These advantages include the variability in the shaping through spraying methods, a certain flexibility depending on the type of plastic the light weight and the chemical and mechanical durability with simultaneously low costs for the hybrid component 1. Compared to the state of the art, it is thus not required to set a blind rivet nut or weld nut and to screw into it a bolt with a functional section. This saves time and effort in the production process, since the hybrid component 1 can be installed in just one step.

FIGS. 2 through 12 show detailed representations of the preferred embodiments of the hybrid component 1 from FIG. 1A through C. FIG. 2 shows a cross-section of hybrid component 1 consisting of a blind rivet nut 12 as component foot 10 and the functional component 40 in the form of a mushroom head. The fastening appendage 20 is integrally designed on the blind rivet nut 12. This fastening appendage 20 comprises an external fastening contour 30, in order to hold functional component 40 on component foot 10. The fastening contour 30 specifically provides a suitable structure, in order to spray on and reliably anchor the functional component 40 made of plastic. The anchoring prevents a displacement of the functional component 40 in the direction of the longitudinal axis of the blind rivet nut 12. It is also preferred that the anchoring also represents an anti-twist protection, so that the functional component 40 cannot be turned around the longitudinal axis of the blind rivet nut 12.

In accordance with one embodiment of the hybrid component 1, the fastening contour 30 comprises a cylindrical area 32, on the radial outside of which a knurl 34 is provided. This construction is shown in FIG. 3. The knurl 34 preferably provides an undercut, which prevents a turning of the functional component 40 around the longitudinal axis of the blind rivet nut 12. In this connection, it is also conceivable that the knurl 34 provides additionally or solely an undercut against an axial displacement of the functional component 40 in the direction of the longitudinal axis of the blind rivet nut 12.

In accordance with another embodiment of the hybrid component 1, the fastening contour 30 comprises an imprinting 36 created through cold forming. This is shown in FIGS. 7 and 8.

The fastening contour 30 thus generally provides a form-fit and/or force-fit connection between the blind rivet construction and the functional component 40. On this constructive basis, a turning and/or displacement of the functional component 40 in relation to the longitudinal axis of the rivet construction is prevented.

In accordance with another embodiment, the component foot 10 has a polygonal cross-sectional form, such as a hexagon. This type of styling is shown in FIG. 4, in which a view from the top of a rivet shaft of the blind rivet nut from FIG. 3 is shown. If this hexagon is inserted into an adapted opening of the structural component 5, for example a hexagonal opening, a specified positioning is possible before the fastening of the hybrid component 1. This pre-positioning supports the later installation of the component in the automobile and delivers further anti-twist protection of the hybrid component 1.

The fastening of the blind rivet nut 12 on the structural component 5 is shown in FIGS. 5A, B and 9A, B. In order to simplify the illustration, the functional component 40 is not shown. The embodiments of the fastening contour 30 already discussed above can also be seen in the various figures. FIG. 5 shows a cylindrical area 32 with the knurl 34, while FIG. 9 shows the imprinting 36, which is provided on the cylindrical area 32. A threaded pin is inserted into the opening 42 of the hybrid component 1 and turned during the installation of the hybrid component 1. Through the rotation of the threaded pin, the component foot 10 or the rivet shaft of the blind rivet nut 12 is compressed so that the blind rivet nut 12 is fastened on the structural component 5 (see FIGS. 5B, 9B).

FIG. 6 shows a sectional view of a hybrid component 1, which also has the blind rivet nut 12 as component foot 10. A lever structure is fastened to the fastening appendage 20 via the imprinting 36 as functional component 40. This lever structure later serves to fasten bumpers in the automobile.

FIG. 10 shows an exploded view of a hybrid component 1 with ball head as functional component 40. The ball head 40 with penetrating opening 42 is fastened on the fastening appendage 20 with fastening contour 30. The fastening appendage 20 is in turn integrally designed on the bucket sealed blind rivet 14. The same structures, which are referred to in the description for FIGS. 2 through 9, can be used to design the fastening appendage 20 and the fastening contour 30. The embodiments in FIGS. 11 and 12 comprise for example the cylindrical area 32 with knurl 34. The bucket sealed blind rivet 14 is fastened in a known manner on structural component 5 via a rivet pin 16, so that the thus fixed hybrid component 1 serves to couple other components on the structural component 5.

We claim:

1. Hybrid component for the fastening of functional elements, in particular in an automobile, which has the following characteristics:
   a. a component foot consisting of a blind rivet construction made of metal with which the hybrid component can be rigidly fastened to a structural component;
   b. a fastening appendage, which is connected with the component foot and comprises a fastening contour for a functional component, wherein
   c. the functional component is made of plastic and is connected with the fastening appendage so that a component can be coupled with the structural component via the functional component and the component foot, wherein a torque-proof and axially unshiftable anchoring of the functional component is realized on the component foot by the fastening contour having an imprinting on a cylindrical area so that the functional component is rigidly connected to the fastening appendage.

2. Hybrid component according to claim 1, the component foot of which is formed through a blind rivet nut or a sealed blind rivet.

3. Hybrid component according to claim 1, the fastening appendage of which is integrally connected with the component foot.

4. Hybrid component according to claim 1, the fastening contour of which comprises a cylindrical area with a knurl lying outside radially, which forms an undercut against rotation and/or axial translation.

5. Hybrid component according to claim 1, the fastening contour of which comprises the imprinting created through cold forming.

6. Hybrid component according to claim 1, the functional component of which is fastened on the fastening appendage via plastic extrusion coating.

7. Hybrid component according to claim 1, the functional component of which is fastened on the fastening appendage through gluing, screwing, snapping or riveting.

8. Structural component of an automobile, being connected to the automobile by a hybrid component according to claim 1.

* * * * *